United States Patent [19]

Kirk

[11] Patent Number: 4,519,158

[45] Date of Patent: May 28, 1985

[54] FISHING LINE ACTIVATOR INDICATOR

[75] Inventor: Johnie C. Kirk, Garden Grove, Calif.

[73] Assignee: Carl R. Rodriguez, Hemet, Calif. ; a part interest

[21] Appl. No.: 540,564

[22] Filed: Oct. 11, 1983

[51] Int. Cl.³ ............................................. A01K 97/12
[52] U.S. Cl. .......................................... 43/17; 43/17.5
[58] Field of Search ............................... 43/17, 17.5, 16

[56] References Cited

U.S. PATENT DOCUMENTS

| | | | |
|---|---|---|---|
| 2,634,538 | 4/1953 | Sader | 43/17 |
| 3,283,438 | 11/1966 | Wagner | 43/17 |
| 3,364,610 | 1/1968 | Poole | 43/17 |
| 3,571,536 | 3/1971 | Sparks | 43/17 |
| 3,711,847 | 1/1973 | Barrows | 43/17 |
| 4,006,550 | 2/1977 | Rizzo | 43/17 |

FOREIGN PATENT DOCUMENTS 463794  3/1950  Canada ................................. 43/17

Primary Examiner—Gene P. Crosby
Attorney, Agent, or Firm—Harvey S. Hertz

[57] ABSTRACT

Apparatus for indicating activation of a fishing line which includes a support body and a switching mechanism for activating a light indicator on the support body. The support body is secured to a fishing pole having a fishing line associated therewith. The switching mechanism activates the light indicator when a force is applied to the fishing line. The switching mechanism includes an L-shaped base having a vertical arm and a horizontal arm. One end of the vertical arm is secured adjacent to the support body. The other end of the vertical arm is secured to one end of a horizontal arm. A contact number is secured to the other end of the horizontal arm and is adjustable along an axis perpendicular to the plane of the horizontal arm. A curved spring member has one end secured adjacent to the other end of the support body. The free end of the curved spring arm terminates in an upwardly-extending axis generally parallel to the plane of the L-shaped base vertical arm. The spring arm free end has an opening therein for positioning the fishing line therein.

1 Claim, 1 Drawing Figure

FISHING LINE ACTIVATOR INDICATOR

BACKGROUND OF THE INVENTION (1) Field of the Invention

The invention relates in general to fishing line activated indicators, and more particularly to a switching mechanism for operating a light indicator when a fish is detected at one end of the fishing line.

(2) Description of the Prior Art

Signaling devices to indicate a bite or strike on a fish hook bearing line are well known. Typically, the devices are relatively complex or unreliable. Arrangements must normally be made to mount the signaling device on a fishing rod. If the signaling device is too heavy, it has been found that the user finds the device relatively uncomfortable. On the other hand, light weight devices normally do not carry sufficient structure so that operational problems occur in the signaling. Additionally, the signaling device normally remains on even though the fish is no longer secured to the fish hook.

Known prior art includes U.S. Pat. Nos. 4,209,930; 3,868,668; 4,006,550; 3,188,767; 3,740,888; 3,175,320; 3,711,847; and 3,571,536.

The present invention provides a relatively lightweight structure which can be mounted on a fishing rod and provide a signal to indicate a bite or strike on fish hookbearing line associated with the rod. The signaling device is relatively simple yet sufficiently sensitive so that false indications normally do not occur. Should the fish be released from the hook, the signaling device is deactivated.

SUMMARY OF THE INVENTION

Apparatus for indicating activation of a fishing line includes a support body having a signal light indicator mounted therein. The support body can be secured to a fishing pole or rod having a fishing line associated therewith. A switching mechanism is used to activate the light indicator when a force is applied to the fishing line and deactivate the light indicator when the fish is released from the line, as during nibbling. The switching mechanism includes an L-shaped base having a vertical arm and a horizontal arm. One end of the vertical arm is secured adjacent to the support body. The other end of the vertical arm is secured to one end of the horizontal arm. A contact is secured to the other end of the horizontal arm and is adjustable along an axis perpendicular to the plane of the horizontal arm. A curved spring arm has one end secured adjacent to the other end of the support body and its free end terminates in an upwardly extending axis generally parallel to the axis of the L-shaped base vertical arm. The spring arm free end has an opening therein for positioning the fishing line therein.

The advantages of this invention, both as to its construction and its method of operation, will be readily appreciated as the same becomes better understood by reference to the following detailed description when considered with the accompanying drawings which like reference numerals designate like parts throughout the figures.

BRIEF DESCRIPTION OF THE DRAWINGS

The FIGURE is a fragmentary view in perspective of an embodiment of the device of this invention mounted in an operative position on a flexible fishing rod.

DETAILED DESCRIPTION

Figure 1:
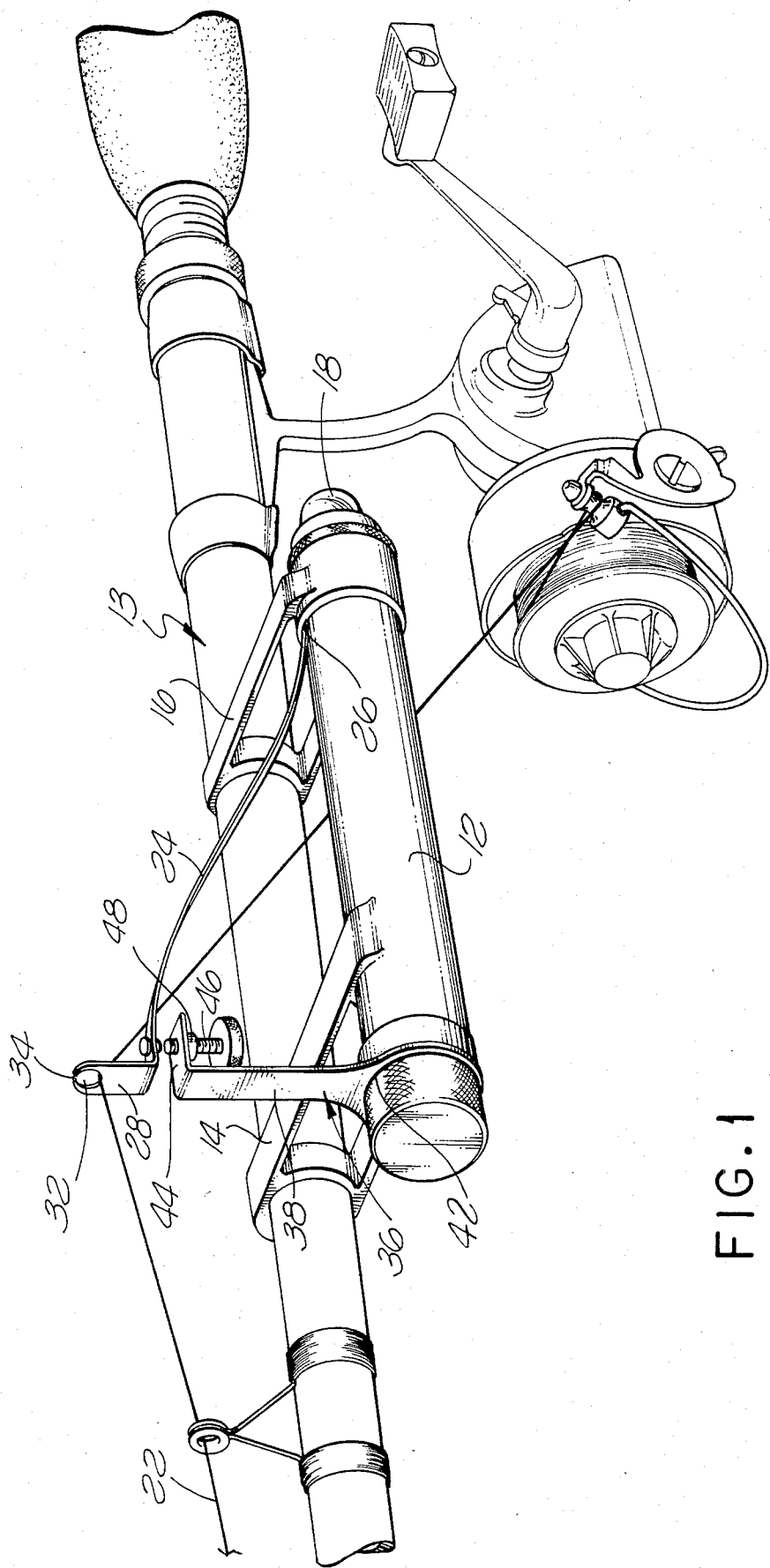

Referring now to the drawings, there is shown in the drawing, a fishing line indicator constructed in accordance with principles of the invention. The fishing line indicator includes a support body 12 which is secured to a conventional fishing pole 13 by a pair of clamps 14 and 16. One end of the support body 12 contains an illumination device such as a light 18. The light 18 and a portion of the support body could be constructed from a conventional flashlight. When a fish is secured to the end of the fishing line 22 associated with the fishing pole 13, the light 18 is illuminated, thereby providing a signal indication to the user, and when released from the fishing line the light 18 is no longer illuminated.

The fishing line indicator includes a switching mechanism formed of a pair of terminals which are normally separated at one end thereof and connected at the other end to the support body. One of the switching mechanism terminals includes a curved spring arm 24 which is connected at one end to a support body end terminal 26. The other end of the curved spring arm 24 is integrally connected to one end of the vertical arm 28. The other end of the vertical arm 28 contains an aperture 32 through which the fishing line 22 passes. A slot 34 interconnects the aperture 32 with the outer periphery of the vertical arm 28 enabling the fishing line to be positioned in the aperture 32.

An L-shaped base arm 36 forms the other part of the switching mechanism terminal and includes a vertical section 38, one end of which is connected to a support body terminal 42. The other end of the vertical section is integrally connected to one end of a horizontal arm 44. The other end of the horizontal arm 44 contains an adjustable contact member formed of a threaded screw 46 which passes through a washer 48 affixed to the horizontal arm.

As can be seen, adjustment of the screw contact member 46 enables the distance between the curved spring arm 24 and the base arm 36 to be varied, thereby adjusting sensitivity of the switching mechanism.

When a fish is secured to one end of the fishing line 12, the force thereof causes the curved spring arm 24 to contact the contact member (threaded screw 46), closing an electrical circuit and switching on the light 18. When the fish is released from the line as during nibbling, the circuit is opened, and the light 18 is no longer illuminated. Typically, the support body 12 would include batteries so as to enable an electrical circuit to be closed through a path formed of the contact member 46, the curved spring arm 24, the end terminal 26, the batteries in the support body 12, and hence through the L-shaped base arm 36.

When casting, the fishing line 22 is removed from the aperture 32 through the slot 34. When the cast has been completed the fishing line 22 is returned to the aperature 32, and is ready to activate the signal light 18.

I claim:

1. Apparatus for indicating activation of a fishing line comprising:

a support body having a signal light indicator means mounted therein and having means for securing said body to a fishing pole having a fishing line associated therewith;

switching means for activating said light indicator when a force is applied to said fishing line, said switching means including an L-shaped base having a vertical arm and a horizontal arm, one end of said vertical arm being secured adjacent to said support body, the other end of said vertical arm being secured to one end of said horizontal arm; a screw contact number being secured to the other end of said horizontal arm and being adjustable along an axis perpendicular to the plane of said horizontal arm; and a curved spring arm having one end secured adjacent to the other end of support body and its free end terminating in an upwardly-extending axis generally parallel to said L-shaped base vertical arm, said spring arm free end having an opening therein for positioning said fishing line therein once said fishing line has been cast, said adjustable contact member being adjustable to vary the distance between said contact member and said curved spring arm.

* * * * *